United States Patent [19]

Rathert

[11] 4,231,466

[45] Nov. 4, 1980

[54] BOOK BLOCK TRANSPORT SYSTEM

[75] Inventor: Horst Rathert, Minden, Fed. Rep. of Germany

[73] Assignee: Rahdener Maschinenfabrik August Kolbus, Wesphalia, Fed. Rep. of Germany

[21] Appl. No.: 906,843

[22] Filed: May 17, 1978

[30] Foreign Application Priority Data

Jun. 4, 1977 [DE] Fed. Rep. of Germany ....... 2725416

[51] Int. Cl.[3] .............................................. B65G 29/00

[52] U.S. Cl. ..................................... 198/479; 198/696

[58] Field of Search ............... 198/479, 486, 696, 695, 198/694, 644, 682, 653; 214/113 P

[56] References Cited

U.S. PATENT DOCUMENTS

| | | | |
|---|---|---|---|
| 2,942,719 | 6/1960 | Bofinger | 198/373 |
| 3,096,869 | 7/1963 | Creed et al. | 198/653 X |
| 3,669,246 | 6/1972 | Risi | 198/695 |
| 3,702,129 | 11/1972 | Hawkes et al. | 198/695 |

FOREIGN PATENT DOCUMENTS

| | | | |
|---|---|---|---|
| 1262221 | 9/1968 | Fed. Rep. of Germany | 198/696 |
| 2458543 | 6/1976 | Fed. Rep. of Germany | 198/696 |

*Primary Examiner*—Robert B. Reeves
*Assistant Examiner*—Douglas D. Watts

[57] ABSTRACT

A book block transport system having a plurality of block pincers continuously movable in a closed circular path, the block pincers comprising a supporting frame which includes a stationary internal clamping jaw. A swinging frame is rotatably suspended at one end from the supporting frame and has attached to the other end an external clamping jaw which is positioned so as to allow clamping of a book block between the internal and external clamping jaws. The internal and external clamping jaws are urged together by an elongated torsion bar spring. The swinging frame is rigidly attached to one end of the torsion bar spring and a cam lever is rigidly attached to the other end of the torsion bar spring. Movement of the external clamping jaw with respect to the internal clamping jaw is provided for by rotation of the cam lever. A cam follower positioned on the end of the cam lever fits within the groove of a stationary two-dimensional cam to provide for rotation of the cam lever. In one enbodiment of the invention the opening and closing of the external clamping jaw with respect to the internal clamping jaw as well as the exertion of the clamping force is provided for by the movement of the cam follower with respect to the groove in the cam. In another embodiment of the invention, a compression arm is integral with the cam lever. A drive rail is arranged on the side of the system opposite the internal clamping jaw to provide for movement of the compression arm with respect to the rail. The clamping force by the external clamping jaw is provided by movement of the compression arm with respect to the guide rail. Further movement of the external clamping jaw is provided by the cam lever moving within the two dimensional cam.

4 Claims, 7 Drawing Figures

BOOK BLOCK TRANSPORT SYSTEM

BACKGROUND OF THE INVENTION (1) Field of the Invention

The present invention relates to an apparatus for binding books. More particularly, the present invention relates to a book block transport system of the type which allows book blocks to be held in position and moved through various operating stages during the binding process.

(2) Description of the Prior Art

A conventional book block transport system is disclosed in German Patent Application No. P 24 58 543.1 published June 16, 1976. This patent application discloses a book block transport system of the type having a plurality of block pincers continuously movable in a closed circular path. The block pincers include a supporting frame which is adapted to be movably positioned in bottom and top guides of the system. The block pincers are capable of being moved in a closed circular path by a drive connection driven by a transport chain. Book blocks are held in the transport system as follows: the supporting frame has a stationary internal clamping jaw and includes a swinging frame suspended from the supporting frame at one end and having attached to the other end an external clamping jaw. The force urging the external clamping jaws toward the internal clamping jaw is provided for by a torsion bar spring. In the German patent application, the swinging motion for opening and closing of the external clamping jaw with respect to internal clamping jaw is occasioned by a rail, a swinging lever, a bearing arm, a guide roller, and a second swinging lever. The clamping force transmitted by the torsion bar spring occurs from the drive rail. The apparatus for providing the swinging motion for opening and closing the jaws in the above-described patent application is complex and requires frequent maintenance. Also, because of the number of parts, the prior art system vibrates to a significant degree thus further complicating operation and maintenance problems. Moreover, the speed at which the apparatus allows for opening and closing of the jaws is relatively slow.

It is one subject of the present invention to provide a book block transport system which has a simplified construction. It is another object of the present invention to provide a book block transport system which is relatively free from vibrations.

It is another object of the present invention to provide a book block system wherein the speed of the opening and closing of the jaws is increased.

SUMMARY OF THE INVENTION

The present invention provides a book block transport system which allows for opening and closing of the external jaw of a block pincer in a simplified manner. The apparatus provides a transport system which is nearly free from vibrations. The apparatus also provides for increased speed of operation of the opening and closing of the external law.

The present invention is useful in a conventional book block transport system of the type having a plurality of block print pincers which are continuously movable in a closed circular path. The pincers comprise a supporting frame which is adapted to be movably positioned in guide grooves of the system. The block pincers are moved in a closed circular path by a transport chain. The supporting frame includes a stationary internal clamping jaw. A swinging frame is rotatably suspended at one end of the supporting frame and has attached to the other end an external clamping jaw. The internal and external clamping jaws are urged together by a torsion spring. The swinging frame is rigidly attached to one end of the torsion bar spring and a cam lever is rigidly attached to the other end of the torsion bar spring. The present invention provides a simplified structure for moving the external clamping jaw with respect to the internal clamping jaw. The simplified structure includes a two-dimensional cam having a groove therein, the cam being stationary with respect to the block pincers. One end of the cam lever includes a cam follower member such as an arcuately shaped ball or a cylindrical roller which is positioned within the groove and is capable of vertical movement with respect to the cam to provide for rotation of the cam lever. The cam lever is operatively connected through the torsion bar spring to the external clamping jaw to allow movement of the external clamping jaw when the cam lever is rotated. In one embodiment of the invention the two dimensional cam, the cam follower member and cam lever provide for the exertion of the clamping force of the external clamping jaw on a book block positioned between the external and internal clamping jaws as well as movement of the external clamping jaw with respect to the internal clamping jaw. In another embodiment of the invention, the apparatus for providing the clamping force includes a compression arm which is integral with the cam lever, the compression arm being moved so as to press the external clamping jaw against a book block by movement of the compression arm with respect to a guide rail. The distance between the guide rail and the supporting frame varies along the closed circular path of the block pincers to effect a clamping force between the external clamping jaws and the internal clamping jaws when desired.

DETAILED DESCRIPTION OF THE INVENTION

Figure 1:
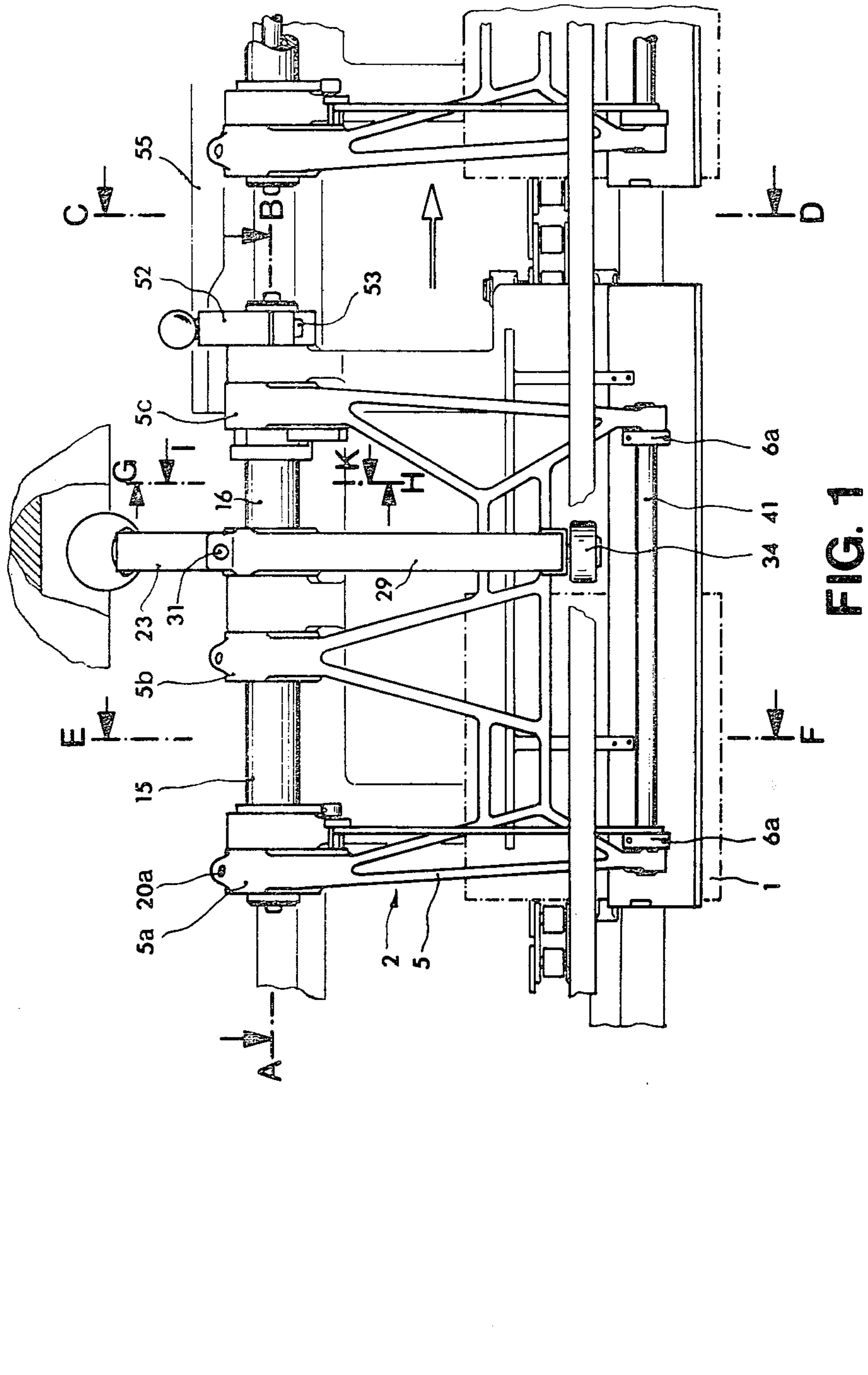
FIG. 1 is a front elevational view of the block pincers of the book block transport system.
Figure 3:
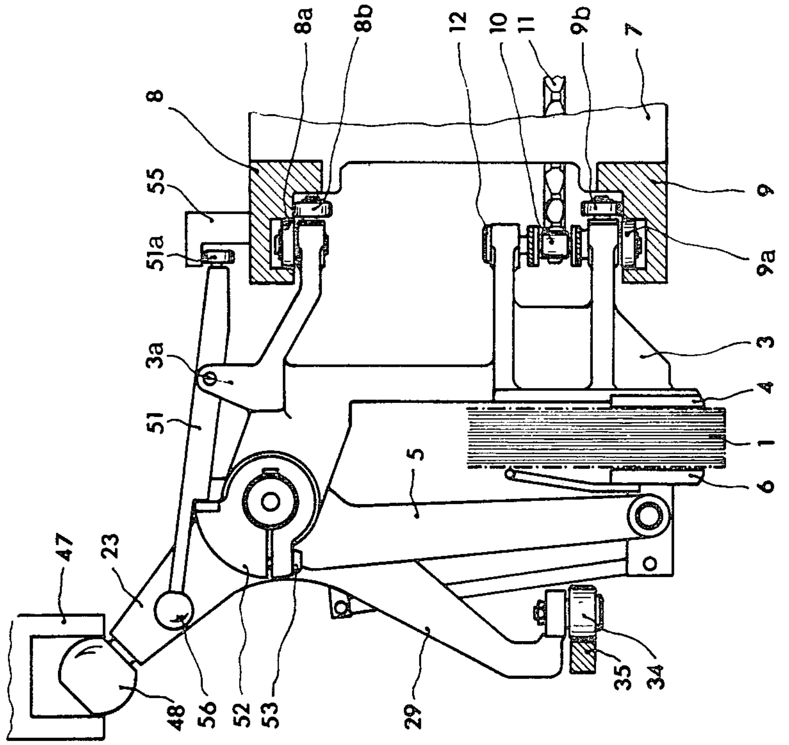
FIG. 3 is a sectional view along the line C–D of FIG. 1.

Referring to FIG. 1, a book block transport system includes a large number of book block pincers spaced equidistant from one another and continuously movable in a closed circuit path. FIG. 1 shows a frontal view of one entire book block pincer 2 which has pressed therein a book block 1 and a portion of a second block pincer 2*a* which holds a second book block 1*a*. Book block pincers 2 and 2*a* are moved continuously in a circular path by a mechanical means such as an elongated chain 11. As shown in FIG. 3, block pincer 2 includes a rigid supporting frame 3 which is integral with a clamping jaw 4 which functions to clamp one side of book 1. Supporting frame 3 also supports a swinging frame 5 which is suspended at one end from supporting frame 3 and which at its other end includes a rotatable external clamping jaw 6 which clamps another side of book 1.

Frame 3 moves relative to a stationary support which is shown generally at reference character 7. Stationary support 7 includes a top rail 8 which includes two guide grooves, rail 8 being formed in a closed circular path in which horizontal guide roller 8*a* and vertical guide roller 8*b* move. Stationary support 7 also includes a bottom guide rail 9 which includes two guide grooves, rail 9 being formed in a closed circular path in which a horizontal guide roller 9*a* and a vertical guide roller 9*b* move. The guide rollers 8*a*, 8*b*, 9*a* and 9*b* are operatively connected to supporting frame 3 to allow movement of frame 3 with respect to the stationary support 7. To provide movement of frame 3 with respect to stationary support 7, an axle pin 12 is provided which allows frame 3 to be driven by roller chain 10 which is in turn driven by sprocket wheel 11.

Supporting frame 3 supports a spring mechanism which allows for clamping of the book 1 between jaws 4 and 6 by swinging of arm 5. The spring mechanism provides for a predetermined amount of pressure to be imposed by clamping jaw 6 against book 1 depending on the thickness of book 1. The spring mechanism is shown best by FIGS. 1 and 2. Supporting frame 3 supports bearings 5*a*, 5*b* and 5*c* which may rotate freely with respect to frame 3. Supporting frame 3 supports left hand tube 15 as well as right hand tube 16. The ends of both tubes 15 and 16 are firmly connected to a torsion bar spring 17. To provide for this firm connection, heads 17*a* of spring 17 are provided with wedge shaped surfaces 17*b* to support wedges 18 which engage in grooves 19 of tubes 15 and 16. Bearings 5*a* and 5*b* are connected to left hand tube 15. Bearings 5*a* and 5*b* are locked with respect to left hand tube 15 by adjusting springs 20 and clamping screws 20*a*. Thus, the left end of spring 17 is rigidly connected to swinging frame 5 to provide for movement of spring 17 when swinging frame 5 is rotated. Bearing 5*c* is supported on right hand tube 16 and freely rotates with respect to supporting tube 16. To prevent tubes 15 and 16 from axial movement, heads 17*a* of torsion bar spring 17 allow for the insertion of cap screws 27 which allow washers 28 to bear against the ends of the tubes.

Figure 2:
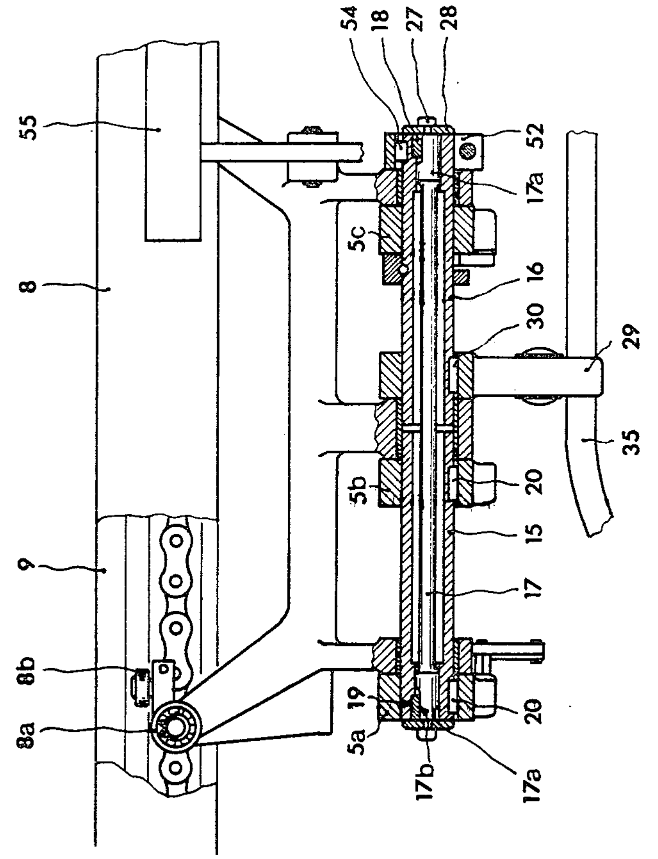
FIG. 2 is a sectional view along the line A–B of FIG. 1.

As shown in FIGS. 1, 2 and 3, right hand tube 16 is connected to a pressure lever 29 which extends downwardly from right hand tube 16. Pressure lever 29 is rigidly secured to tube 16 by adjusting spring 30 as well as clamping screw 31. At the end of pressure lever 29 is located a guide roller 34 which is guided by a control rail 35. As shown in FIG. 2, guard rail 35 is shaped to provide for movement of lever 29 inwardly and outwardly with respect to frame 3 depending on the shape of rail 35.

The compression of book block 1 between jaws 4 and 6 is provided for as follows. The bool block shown in FIG. 3 is under compression by torsion spring 17. Rail 35 holds roller 34 and, thus, compression arm 29 is in a position which twists the right side of spring 17 in the counterclockwise direction as viewed in FIG. 3. The force transmitted to spring 17 through compression arm 29 is, in turn, transmitted to swinging frame 5 at the left side of spring 17. The angular twist of the left side of spring 17 with respect to the right side of spring 17 determines the amount of force which external clamping jaw 6 exerts on book block 1.

Figure 4:
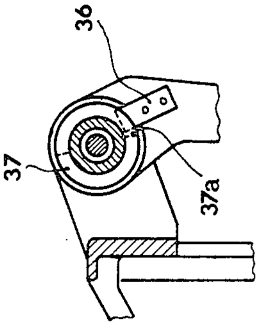
FIG. 4 is a sectional view along the line G–H of FIG. 1.

As shown in FIG. 4, the spring mechanism is provided with a stop part 36 at the right hand jib of swinging frame 5 and is combined with a contact surface 37*a* of ring 37 and pinned to right hand tube 16. In order to provide for sufficient clamping force when a thin book block is being used, right hand tube 16 is twisted with respect to tube 15 a predetermined torsion angle of preferably about 15°. The 15° angle is held by the previously mentioned stop part 36 and contact surface 37*a*. Thus, a desired degree of pressure between jaws 4 and 6 can be maintained even when the book block is relatively thin. It should be understood that the stiffness of the torsion spring and the angle between tubes 15 and 16 can be chosen according to the requirements of the system.

As mentioned previously, the external clamping jaw 6 may rotate about swinging frame 5 to provide for clamping of book blocks of different thicknesses. Clamping jaw 6 is supported by bearings 6a (FIG. 1) which are rotatable with respect to shaft 41 which in turn is connected to swinging frame 5.

Figure 5:
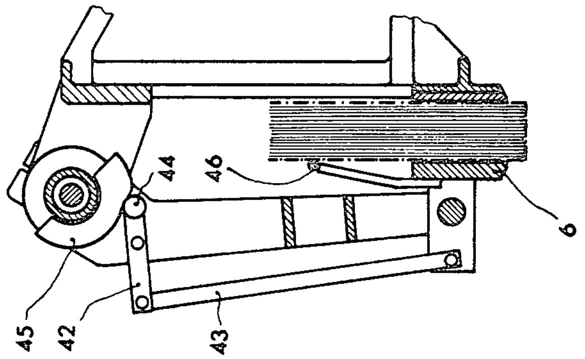
FIG. 5 is a sectional view along the line E–F of FIG. 1.

To allow for precise clamping of book block 1, it is preferable for the face of external clamping jaw 6 which is in contact with book block 1 be in the vertical position. To provide for the vertical positioning of external clamping jaw 6, steering lever 42 and steering rod 43 are in articulated connection with one of the bearings 6*a* of external clamping jaw 6 and are also connected to swinging frame 5 as shown in FIG. 5. The free end of lever 42 includes a follow-up roller 44 which runs on a cam disk piece 45 bolted to supporting frame 3. In order to keep large sized book blocks 1 closed over their entire width, external clamping jaw 6 includes a support rod 46.

The present invention provides a simplified structure which in turn provides for a simplified functioning of the book block transport system. Advantages achieved by the present invention include the use of less parts, the parts being simplified in construction and thus being less costly. A further advantage is that the system can operate at increased speeds with greater reliability. The novel structure for opening and closing of swinging frame 5 includes a simple two-dimensional cam 47 as is best shown in FIG. 3. Cam lever 23 is rigidly connected with pressure lever 29. The end of cam lever 23 includes a cam follower member 48 designed as a ball in the embodiment shown in FIG. 3. Cam 47 extends at least a portion of the intended path of the block pincers to provide for opening and closing of swinging frame 5. Cam 47 engages cam follower member 48 to force lever 23 to rotate with respect to frame 3. It is evident that the cam follower member 48 has a degree of freedom in the vertical direction of the internal walls of cam 47 to allow upward deviation of cam follower member 48. Two-dimensional cam 47 is located in a plane which is horizontal with respect to stationary support 7. Cam 47 has a rail shape and is positioned at various distances from stationary support 7 to provide for movement of lever arm 23 depending on the location of block pincers during the cycle around the stationary support 7.

Figure 3A:
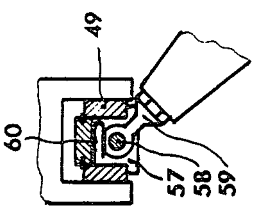
FIG. 3A is a sectional view of an alternative embodiment of the follow-up member shown in FIG. 3.

An alternative embodiment of cam follower member 48 is shown in FIG. 3*a*. The cam follower can be designed as a cylindrical roller which can be swung around an axle. The alternative cam follower member comprises a slotted bearing body 57 which includes a bearing bolt 48 positioned in the slot and secured against axial movement. Extending from cam lever 23 is a rod head 59 which grips bolt 58 but which is rotatable with respect to bolt 58. Positioning of cam follower member 48 is maintained by spring 60 which is attached to rod head 59 as well as to the bottom of the slot.

The block pincers are provided with a jaw locating device which is best shown in FIG. 3. The jaw locating device makes it unnecessary for the control rail 35 to extend over the entire circular path of the block pincers. Supporting frame 3 includes in its upper region a jib 3*a* for bearing a locking lever 51 which pivots around a pin in frame 3. One end of lever 51 includes a freely rotatably roller 51*a*. The other end of lever 51 includes a ball handle 56 which allows for manual operation of lever 51. Stop 52 is fixed to tube 16 by clamping screw 53 as well as by an adjusting spring 54 FIG. 2. Locating of locking lever 51 with stop 52 occurs by lowering of lever 51 due to the weight of the left hand portion of locking lever 51. When locking lever 51 bears against stop 52, the book block between jaws 4 and 6 is held in place. The book block 1 can be released by running roller 51*a* on a cam disk 55. Alternatively, block 1 can be removed from the book block transport system by manual unlocking by pushing handle 56 upwardly.

Figure 6:
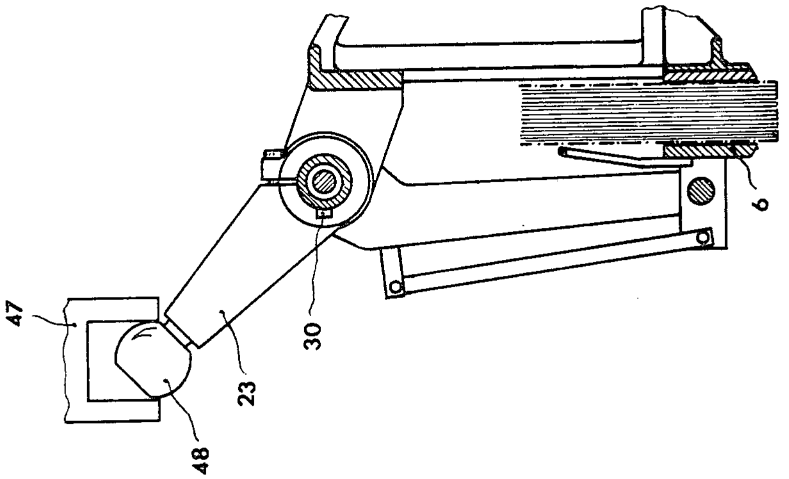
FIG. 6 shows an alternative embodiment of the block pincers and is a sectional view along the line I–K of FIG. 1 with the pressure lever omitted.

Another embodiment of the cam lever 23 is shown in FIG. 6. In this embodiment compression arm 29 is eliminated and the swinging motion of and compression by external clamping jaw 6 is provided for solely by cam lever 23. Thus the opening and closing as well as the exertion of clamping force on jaw 6 occurs from the same cam lever 23.

The mode of operation of the book block system is as follows:

The block pincers continuously rotate in a closed path about support 7 and are driven by a chain 11. Jaw 6 is in the swung-up condition when entering the feed stage of the book block system. Thus, as shown in FIG. 3, clamping jaw 6 would be swung clockwise away from book block 1. Conducted via grooved cam 47, cam lever 23 rotates counterclockwise thus forcing swinging arm 5 having roller 34 into the path of control rail 35. A book block 1 brought into the range between clamping jaws 4 and 6 is clamped by running guide roller 34 on control rail 35 whereby the clamping force is transmitted from pressure lever 29 on clamping jaw 6 via torsion bar spring 17 which causes secure holding of book block 1. This secure holding is accomplished by the tensioning or untensioning of the torsion bar spring 17 corresponding to the force required for the block thicknesses.

After the book block held in the block pincer has run through various processing stations, follow-up roller 34 of pressure lever 29 is conducted via control rail 35 to relieve the clamping force. Thereafter cam follower member 48 which enters cam groove 47 provides for counterclockwise movement of swinging frame 5 and for liberation of book blocks 1 from between jaws 4 and 6.

When using a jaw locating device, the external clamping jaw 6 is kept in a closed position by means of the locking device after jaw 6 is positioned in the clamping position via control rail 35 and pressure lever 29. The jaw locking device is unlocked by running of roller 51 of cam disks 55 in order to enable the unlocking of frame 5.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a book block transport system of the type having a plurality of block pincers, the block pincers comprising a supporting frame which is driven along a continuous path, the supporting frame having at least a first stationary internal clamping jaw, and a swinging frame rotatably suspended from the supporting frame, an external clamping jaw being attached to the swinging frame and being rotatable with respect thereto to provide for positioning of a face of the external clamping jaw parallel to a face of the internal clamping jaw, the transport system further including a torsion spring for urging the internal and external clamping jaws together, the improvement comprising:

a two-dimensional cam having a groove therein, said cam being stationary with respect to the supporting frame;

a cam follower member capable of being positioned within the groove of said cam, said follower being capable of vertical movement with respect to the cam;

lever means operatively connected adjacent a first end thereof of said cam follower member;

means connecting a second end of said lever means to a first end of the torsion spring, the second end of the torsion spring being connected to the swinging frame whereby the lever means operates the external clamping jaw between the open and closed positions;

a compression arm integral with said lever means, a first end of said compression arm being connected to the said first end of the torsion spring;

a guide rail arranged on the side of the transport system opposite to the internal clamping jaw; and means for coupling the second end of said compression arm to said guide rail to cause exertion of the clamping force of the external clamping jaw on a book block positioned between the external and internal clamping jaws.

2. A book block transport system according to claim 1 wherein the external clamping jaw is kept in a closed position during a portion of its movement around the continuous path by a jaw locating device which locks the external clamping jaw in position.

3. A book block transport system according to claim 1 wherein said cam follower member includes a ball capable of being positioned within the groove and capable of vertical movement with respect to the cam.

4. A book block transport system according to claim 1 wherein said cam follower member includes a cylindrical roller which can be rotated around an axle positioned within the groove of the cam.

* * * * *